United States Patent
Yoshida et al.

(10) Patent No.: US 6,761,242 B2
(45) Date of Patent: Jul. 13, 2004

(54) POWER UNIT LAYOUT STRUCTURE

(75) Inventors: Shigeyuki Yoshida, Kanagawa-ken (JP); Mitsuhiro Sonomura, Tokyo (JP); Hiromichi Serizawa, Tokyo (JP); Kentarou Uchibori, Kanagawa-ken (JP); Kouichi Sagawa, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 182 days.

(21) Appl. No.: 10/003,532

(22) Filed: Dec. 6, 2001

(65) Prior Publication Data

US 2002/0096384 A1 Jul. 25, 2002

(30) Foreign Application Priority Data

Jan. 19, 2001 (JP) .................................... P2001-011862

(51) Int. Cl.[7] .............................................. B60R 21/00
(52) U.S. Cl. ...................... 180/298; 180/232; 180/274; 280/784
(58) Field of Search ......................... 280/784; 180/232, 180/311, 312, 291, 298, 299, 271, 274, 297; 296/203.02, 1.03, 187.09

(56) References Cited

U.S. PATENT DOCUMENTS

| | | | | |
|---|---|---|---|---|
| 3,827,525 A | * | 8/1974 | Felzer ......................... | 180/232 |
| 3,883,166 A | * | 5/1975 | Cadiou ........................ | 293/133 |
| 4,240,517 A | * | 12/1980 | Harlow et al. ............... | 180/295 |
| 4,779,834 A | * | 10/1988 | Bittner ........................ | 248/638 |
| 5,178,230 A | * | 1/1993 | Goor ........................... | 180/232 |
| 5,205,374 A | * | 4/1993 | Love et al. .................. | 180/300 |
| 5,477,938 A | * | 12/1995 | Tsuji et al. .................. | 180/274 |
| 5,992,555 A | * | 11/1999 | Sakamoto et al. .......... | 180/232 |
| 6,131,685 A | * | 10/2000 | Sakamoto et al. .......... | 180/232 |
| 6,260,609 B1 | * | 7/2001 | Takahashi .................... | 165/69 |
| 6,276,484 B1 | * | 8/2001 | Evans et al. ................. | 180/291 |

FOREIGN PATENT DOCUMENTS

| | | |
|---|---|---|
| JP | 63-115878 | 7/1988 |
| JP | 7-164895 | 6/1995 |
| JP | 8-132889 | 5/1996 |
| JP | 9-156381 | 6/1997 |
| JP | 9-240291 | 9/1997 |
| JP | 11-245668 | 9/1999 |

* cited by examiner

Primary Examiner—Brian L. Johnson
Assistant Examiner—Brian L Swenson
(74) Attorney, Agent, or Firm—McDermott Will & Emery LLP

(57) ABSTRACT

At the time of head-on collision of a vehicle, an intermediate portion of a subframe 6 is folded and deformed downwardly into a form of L-shape, an engine body 8 is moved downward, a radiator core upper rail 11 is rearwardly deformed and moved, a collision load is input to an upper portion of the engine body 8 through a rod 10, and the engine body 8 is rotated rearward around a connecting member 9. With this, a distance of a shortest portion between the engine body 8 and a dash panel 3 is increased, and a crushing stroke of the engine room 1 is increased.

13 Claims, 8 Drawing Sheets

POWER UNIT LAYOUT STRUCTURE

BACKGROUND OF THE INVENTION

1. Field of the Invention

The present invention relates to a power unit layout structure for an automobile.

2. Description of the Related Art

As conventional power unit layout structures for automobiles, there is a known structure as described in Japanese Patent Application Laid-open No. H11-245668 in which an expandable body is expanded at the time of head-on collision of a vehicle, and a link body connecting an upper portion of a dash panel and a power therebetween is swung so that the power unit drops into a vacant space located below the power unit, and there is a known structure as described in Japanese Patent Application Laid-open No. H7-164895 in which a power unit is previously inclined and mounted below an inclining toe board which is located below a dash panel so that the power unit drops along the inclined toe board at the time of head-on collision of a vehicle.

SUMMARY OF THE INVENTION

In the case of the former conventional art, a vehicle height adjusting mechanism and its control means are necessary as the expandable body, which disadvantageously increases the costs. In the case of the latter conventional art, since the power unit is inclined, the power unit can not be applied to a vehicle unless the vehicle has design corresponding to this special layout, and the latter conventional art inferior in applicability.

Thereupon, the present invention realizes, with simple structure, a power unit layout structure for an automobile in which when a vehicle collides in a longitudinal direction thereof, a distance between a mounting chamber having the power unit and a partition wall partitioning a compartment is increased so that a crushing stroke can be increased and a collision energy can rationally be absorbed even if the expandable body is not expanded.

A first aspect of the present invention provides a power unit layout structure for an automobile for mounting a power unit in a mounting chamber partitioned by a partition wall on a front side or a rear side of a compartment, comprising:

- a side member capable of buckling and deforming in a longitudinal direction with respect to a longitudinal collision of a vehicle;
- a subframe located at a position lower than the side member and having an intermediate portion capable of folding and deforming by a longitudinal collision load;
- a connecting member for connecting a lower portion of a power unit and the intermediate portion of the subframe; and
- a rod for connecting an upper portion of the power unit and a longitudinal-direction end constituent material of the mounting chamber, wherein when the vehicle collides in the longitudinal direction, the intermediate portion of the subframe is downwardly folded and deformed, and the power unit is rotated in the longitudinal direction around a lower connecting point by load transmission applied to an upper portion of the power unit through the rod.

According to the first aspect of the invention, if a collision load is input to the subframe by the longitudinal collision of the vehicle, the intermediate portion of the subframe is downwardly folded and deformed into a L-shape, the power unit is downwardly moved with respect to the vehicle body, the longitudinal-direction end constituent material is crushed, deformed and moved in the longitudinal direction, the collision load is input to the upper portion of the power unit through the rod, and the power unit is rotated in the longitudinal direction around the lower connecting point.

As a result, a distance of the shortest portion between the power unit and the partition wall is increased, the side member is appropriately buckled and deformed in the longitudinal direction, the collision energy can rationally absorbed and the partition wall can be suppressed from being deformed toward the compartment even if the entire length of the mounting chamber is not increased.

DESCRIPTION OF THE PREFERRED EMBODIMENTS

Embodiments of the present invention will be explained below together with the drawings.

Figure 1:
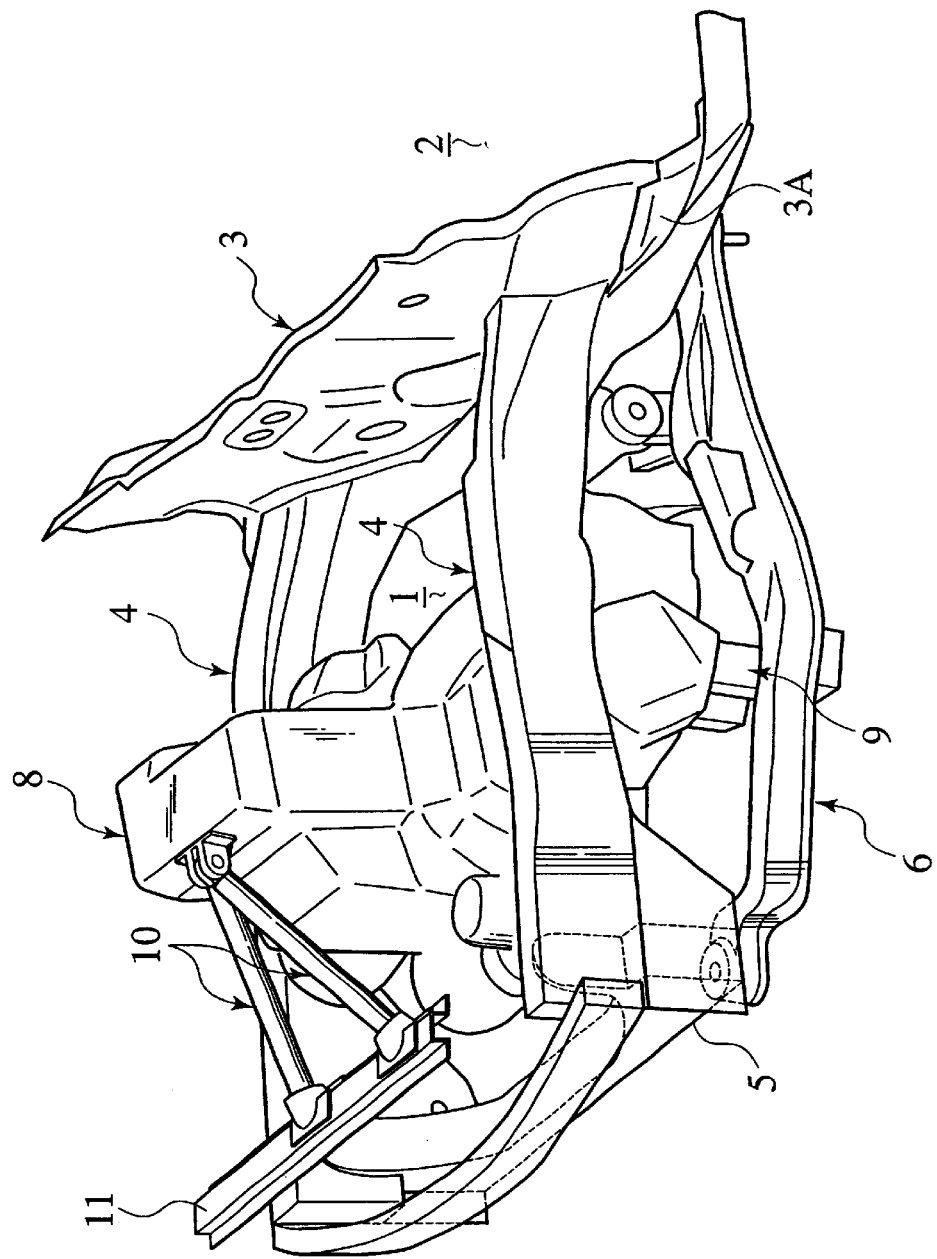
FIG. 1 is a perspective view showing a first embodiment of the present invention.
Figure 2:
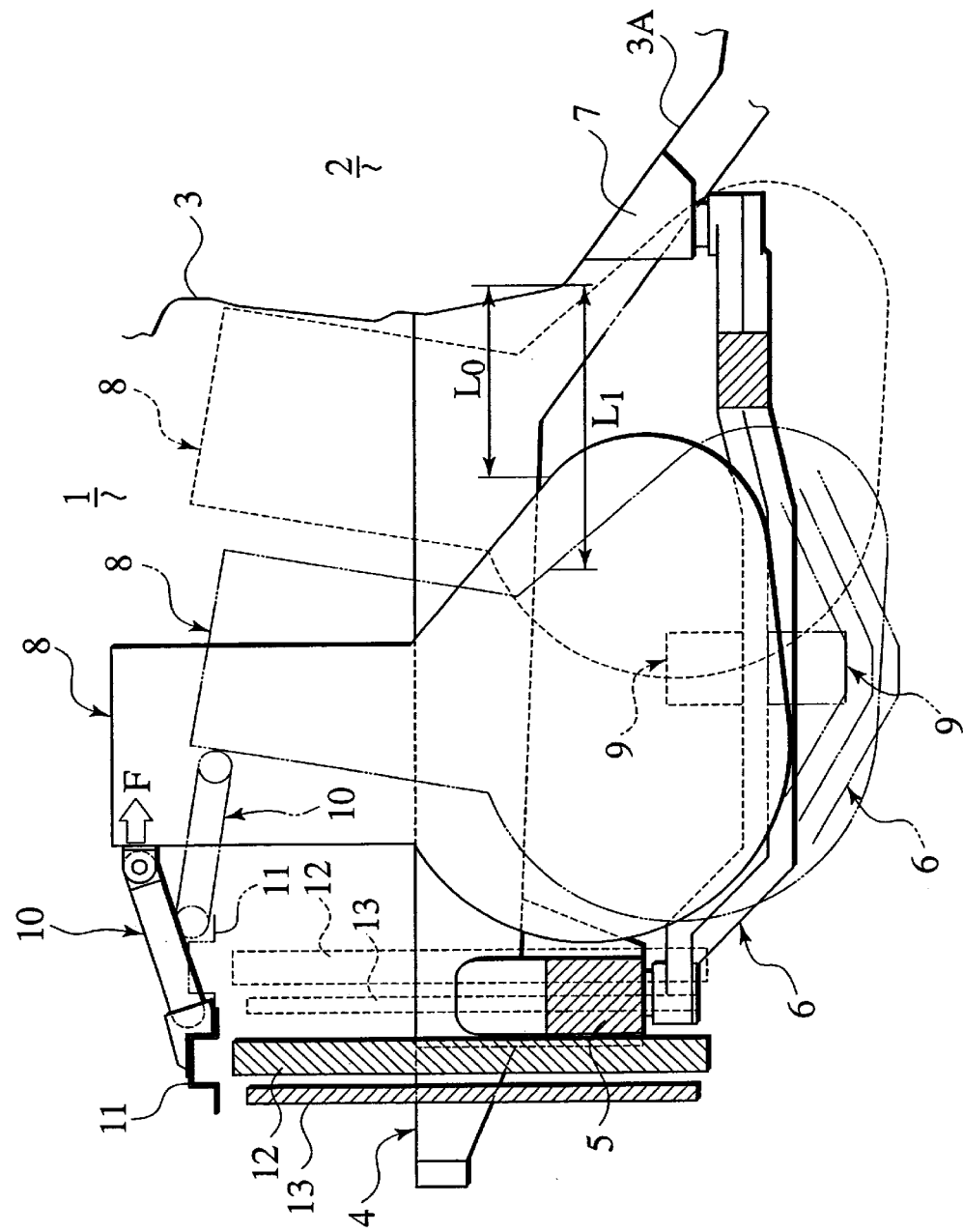
FIG. 2 is a schematic explanatory side view of the first embodiment of the invention.
Figure 3:
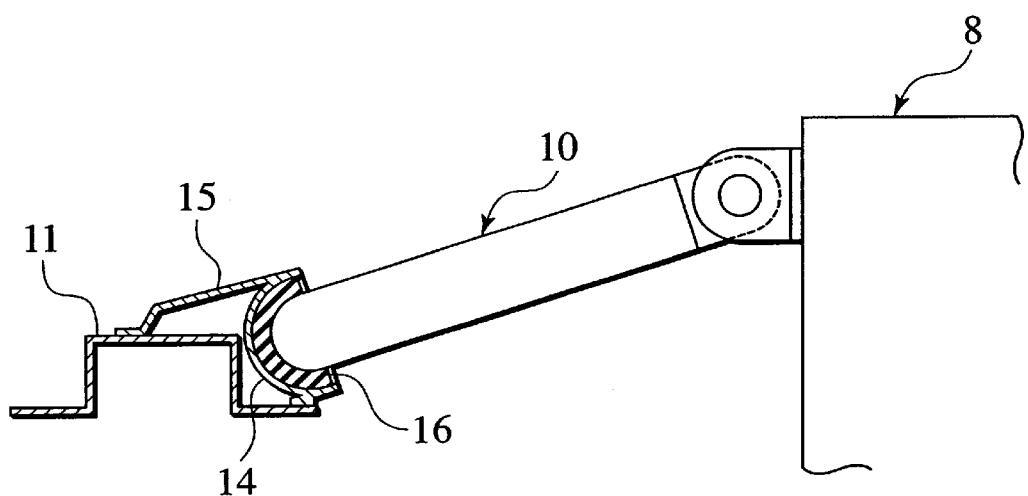
FIG. 3 is a sectional explanatory view of a rod connected portion in the first embodiment.

In FIGS. 1 to 3, a reference number 1 represents an engine room as a mounting chamber partitioned by a dash panel 3 as a partition wall in front of a compartment 2.

Front side members (side members) 4, 4 which are longitudinal direction framework members of a vehicle body front portion extending in the longitudinal direction of the vehicle body are provided on the left and right sides of the engine room 1.

A rear portion of the front side member 4 abuts against the dash panel 3 and is connected to a lower side of a toe board 3A inclined and formed on a lower portion of the dash panel 3 such as to be curved. Front ends of the left and right front side members 4, 4 are connected to each other by means of a first cross member 5.

Subframe 6 are disposed at lower side of the engine room 1 below the front side members 4, 4.

The subframes 6 are formed in parallel crosses, and connected to a lower surface of the first cross member 5 and a seat 7 jointed to the toe board 3A between the lower surface and the seat 7.

The front side members 4, 4 form essential members for absorbing energy at the time of head-on collision of a vehicle, and can be buckled and deformed in the longitudinal direction by axial pressure smashing load applied at the time of head-on collision of a vehicle like a general shock absorber. The front side member 4 is formed into a closed cross section structure combined with a panel member, or into a closed cross section structure by extrusion of aluminum alloy. The front side member 4 is provided with an easily-deformed portion (a portion which is easily deformed by pressure in the axial direction) for inducing bellows-like buckling and deformation of in the longitudinal direction if necessary.

Appropriate means is selectively employed for the subframe 6 so that the subframe 6 is folded and deformed around an intermediate portion of the subframe 6 in its longitudinal direction, e.g., the intermediate portion is joggled lower than front and rear ends as shown in FIG. 1, or plate thickness of the intermediate portion is varied, or the intermediate portion is provided with a folding-inducing bead so that if a head-on collision load is input to the subframe 6, the intermediate portion of the subframe 6 can be folded and deformed.

A reference number 8 represents an engine body 8 as a power unit mounted in the engine room 1. A lower portion of the engine body 8 relatively largely swells toward the partition wall 3 by disposing an output shaft housing of a drive shaft (not shown) or manifold catalyzer. A longitudinal length of the lower portion is longer than a longitudinal length of an upper portion of the engine body 8.

The lower portion of the engine body 8 is connected to and supported by the intermediate portion of the subframe 6 through a connecting member 9.

As the connecting member 9, a mount member of a vibration-proof bush type comprising inner and outer cylinders generally used as an engine mount and an insulator interposed between the cylinders is used.

A longitudinal-direction end constituent material (radiator core upper rail) 11 of the engine room 1 and an upper portion of the engine body 8 are connected to each other by means of rods 10.

An effective material of the longitudinal-direction end constituent material 11 for connecting front ends of the rods 10 is a vehicle body side member extending in a widthwise direction of the vehicle from an uppermost end of the engine room 1 and to which collision load at the time of head-on collision of a vehicle is input, like a radiator core upper rail 11 supporting upper portions of a radiator 12 and an air conditioner capacitor 13. A height from ground of a connection point position of the rod 10 on the side of the engine body 8 is set higher than a connection point position of the rod 10 on the side of the radiator core upper rail 11.

In this embodiment, the pair of rods 10 are provided on opposite sides of the radiator core upper rail 11 in a widthwise direction of the vehicle and on a central portion of the upper portion of the engine body 8 in a form of V as viewed from above as shown in FIG. 1.

Both or one of the engine body side connected portion of the rod 10 and the radiator core upper rail side connected portion is rotatably connected.

As shown in FIG. 3 for example, in this connecting structure, a substantially semi-spherical or substantially semi-cylindrical collar 14 is connected to the radiator core upper rail 11 through a bracket 15, and a substantially semi-spherical or substantially semi-cylindrical insulator 16 is press fitted and fixed into the collar 14, and an end of the rod 10 is rotatably received and held in the insulator 16.

According to this connecting structure, the rod 10 is not only rotatably connected, but is also supported by the insulator 16 in a vibration-proof manner, and the rod 10 can be separated from the insulator 16 with respect to a tensile load.

According to the structure of the embodiment, if a collision load is input to the subframe 6 in the longitudinal direction, the subframe 6 is downwardly deformed around the intermediate portion as shown with chain line in FIG. 2, the engine body 8 moves downward with respect to the vehicle body, a collision load F is input to the upper portion of the engine body 8 through the rod 10 by the rearward crushing deformation movement of the radiator core upper rail 11, and the engine body 8 is rearwardly rotated around the connection point of a lower mount member 9 as shown with the chain line in FIG. 2.

As a result, a distance of the shortest portion between the lower portion of the engine body 8 and the dash panel 3 is increased from $L_0$ to $L_1$ as compared with the length before collision, the crushing stroke in the longitudinal direction can be increased even if the entire length of the engine room 1 is not increased, the buckling deformation of the front side member 4 in its longitudinal direction is appropriately conducted, the collision energy is rationally absorbed, and the dash panel 3 is prevented from being deformed toward the compartment 2.

Especially in this embodiment, even if the vehicle collides in an offset manner, the impact is reliably input and transmitted to the upper portion of the engine body 8 by the pair of rods 10 disposed in the V-shape as viewed from above, and the engine body 8 is allowed to rotate.

A front end of each rod 10 is connected to the radiator core upper rail 11 which is a vehicle body constituent material of the uppermost end of the engine room 1 to which the collision load is input in an early state at the time of head-on collision of a vehicle. Therefore, rotation behavior is applied to the engine body 8 rearwardly at the initial stage of collision, and the movement of the engine body 8 is controlled optimally.

Further, since the height of the rod 10 from the ground of the connection point position on the side of the engine body 8 is higher than the connection point position on the side of the radiator core upper rail 11, a distance between an input point of the load and the lower connecting point by the mount member 9 which is rotation center of the engine body 8 is long, and the rotation moment of the engine body 8 is great and the rearward rotation behavior of the engine body 8 can be carried out smoothly.

Further, both or one of the expandable body side connecting portion and the radiator core upper rail side connecting portion of the rod 10 is rotatably supported through the insulator 16 in the vibration-proof manner, and the rod 10 can be separated from the tensile load. Therefore, the rearward rotation behavior of the engine body 8 can be carried out more smoothly, and even if a load in the tensile direction is applied to the rod 10 during the process of downward movement together with the rearward rotation behavior of the engine body 8, the rod connecting portion is immediately separated, and the rotation behavior and dropping behavior of the engine body 8 are not hindered.

Further, at the normal time, transmission suppressing effect of the vibration of the engine body 8 toward the vehicle body can sufficiently be secured by the vibration-proof function by the insulator 16 interposed between the connecting portions of the rod 10 and the vibration-proof function of the mount member 15 as a lower connecting member of the engine body 8.

Figure 4:
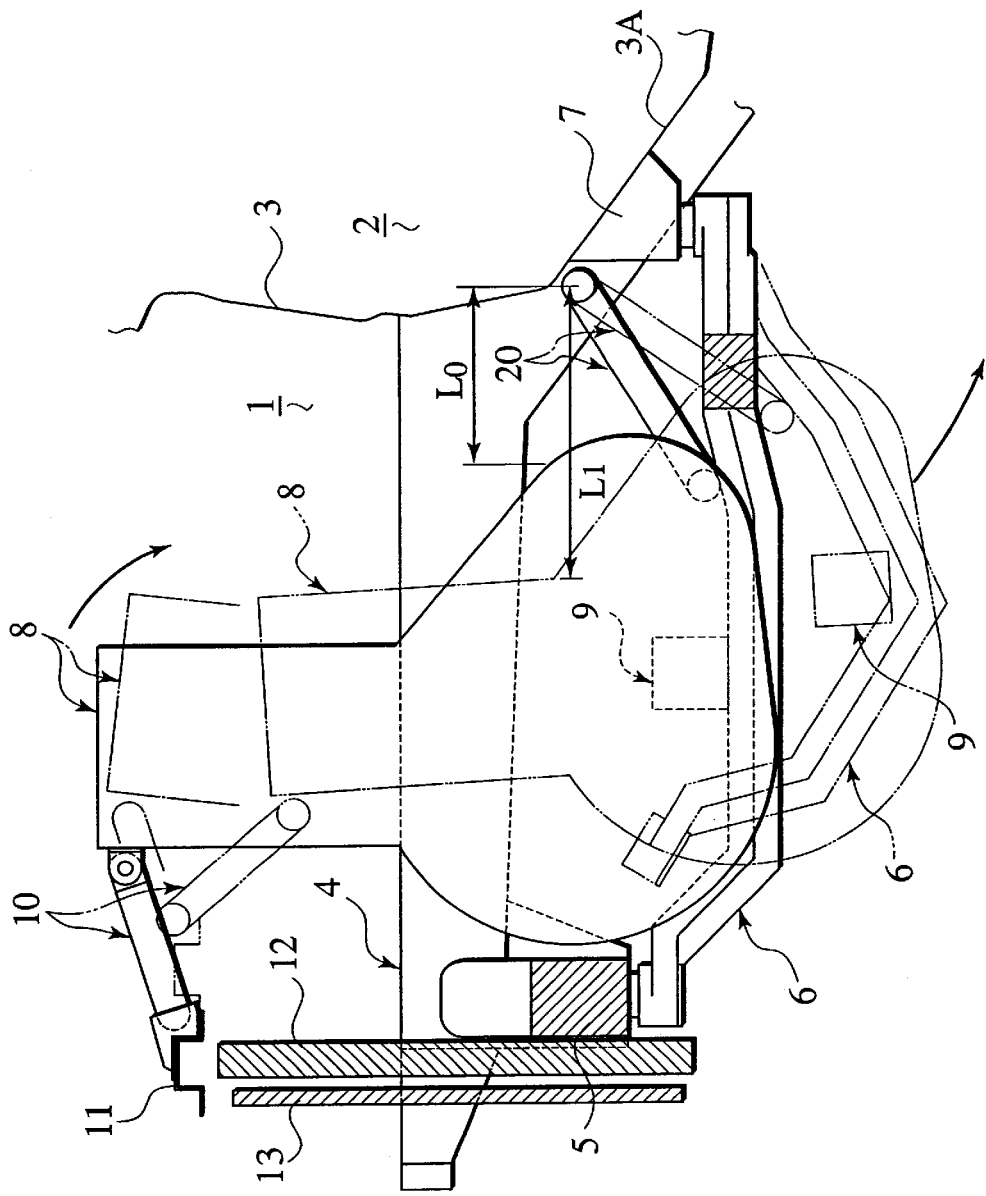
FIG. 4 is a schematic explanatory side view of the second embodiment of the invention.

FIG. 4 shows a second embodiment. In addition to the structure of the first embodiment shown in FIG. 2, in the second embodiment, a guide rod 20 for applying, to the engine body 18, the rotation behavior in which a lower portion of the engine body 18 gets into lower portion of the toe board 3A when the intermediate portion of the subframe 6 is downwardly folded and deformed between the dash panel 3 and the subframe 6.

The guide rod 20 is connected between a portion of the toe board 3A near an inclination upper end thereof and a rear portion of a portion of the subframe 6 where the mount member 9 is disposed. When the intermediate portion of the subframe 6 is downwardly folded and deformed, the guide rod 20 is turned downward around the toe board side connecting portion, and the rotation behavior is applied to the engine body 8 such that the lower portion of the engine body 8 is pulled into the vacant space below the toe board 3A.

Both or one of the toe board side connecting portion and the subframe side connecting portion of the guide rod 20 is rotatably connected.

Figure 5:
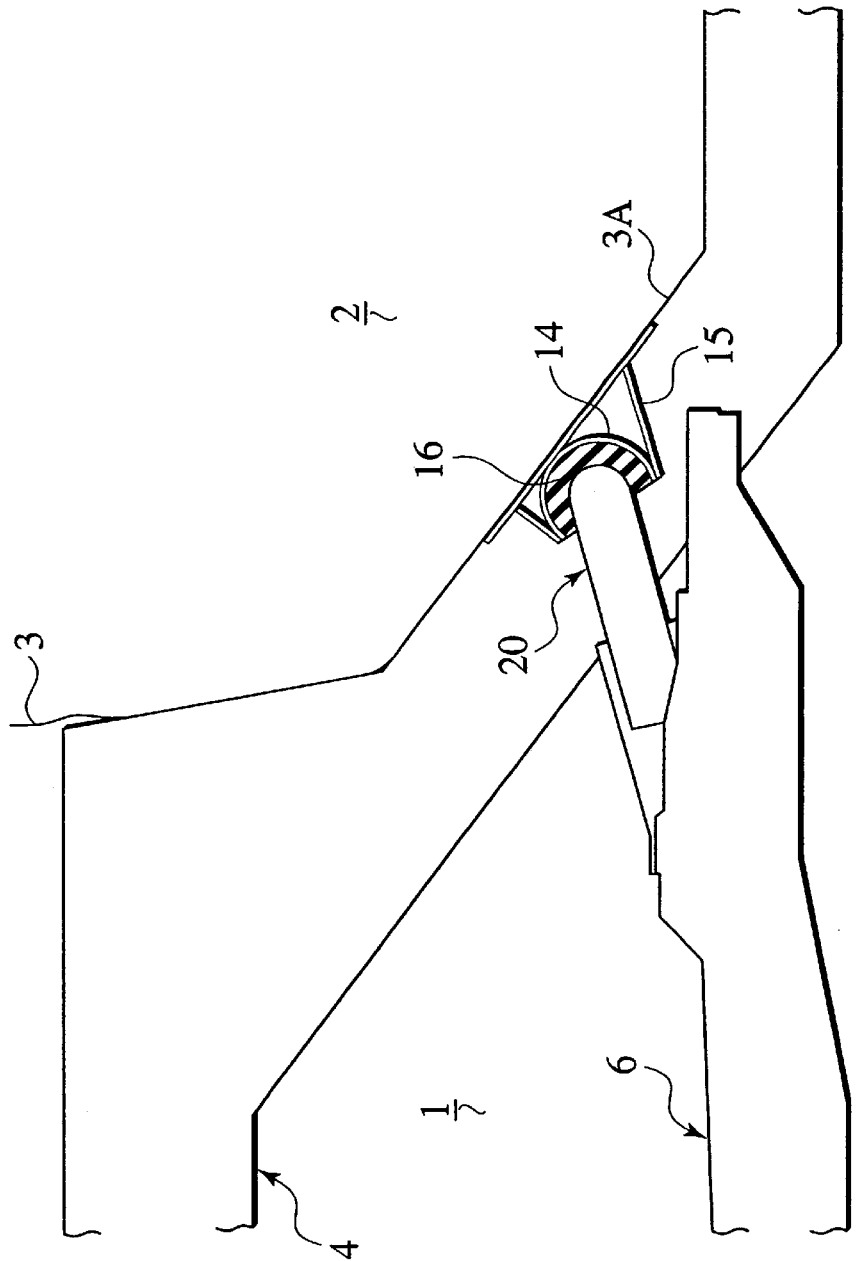
FIG. 5 is a sectional explanatory view of a guide rod connected portion in the second embodiment.

In this connecting structure, like the connecting structure of the rod shown in FIG. 5, a substantially semi-spherical or substantially semi-cylindrical collar 14 is connected to the toe board 3A through the bracket 15, and a substantially semi-spherical or substantially semi-cylindrical insulator 16 is press fitted and fixed into the collar 14, or an end of the guide rod 20 is rotatably received and held in the insulator 16.

Therefore, according to this connecting structure, the guide rod 20 is not only rotatably connected, but is supported by the insulator 16 in the vibration-proof manner, and the guide rod 20 can be separated from the insulator 16 with respect to the tensile load.

According to the second embodiment, in addition to the effect of the first embodiment, when the intermediate portion of the subframe 6 is folded and deformed downward in a form of L-shape, a rear side portion of the subframe 6 is pulled into a lower portion of the toe board 3A by the guide rod 20, and a rotation behavior in which a lower portion of the engine body 8 gets into the vacant space below the toe board 3A is applied to the engine body 8. Therefore, the crushing stroke amount of the engine room 1 can further be increased, the interference between the lower portion of the engine body 8 and the toe board 3A can be avoided, and the deformation suppressing effect of the dash panel 3 toward the compartment 2 can further be enhanced.

Both or one of the toe board side connecting portion and the subframe side connecting portion of the guide rod 20 is rotatably supported by the insulator 16 in the vibration-proof manner, and the guide rod 20 can be separated from the tensile load. Thus, the pulling rotation behavior of the engine body 8 toward the lower portion of the toe board 3A can be smoothly be carried out, and even if the load in the tensile direction is applied to the guide rod 20 during the process of movement of this engine body 8, the guide rod connected portion is immediately separated, the rotation behavior and the dropping behavior of the engine body 8 are not hindered.

Further, at the normal time, by the vibration-proof of the insulator 16, the engine vibration can be suppressed from being transmitted to the dash panel 3 from the guide rod 20.

Figure 6:
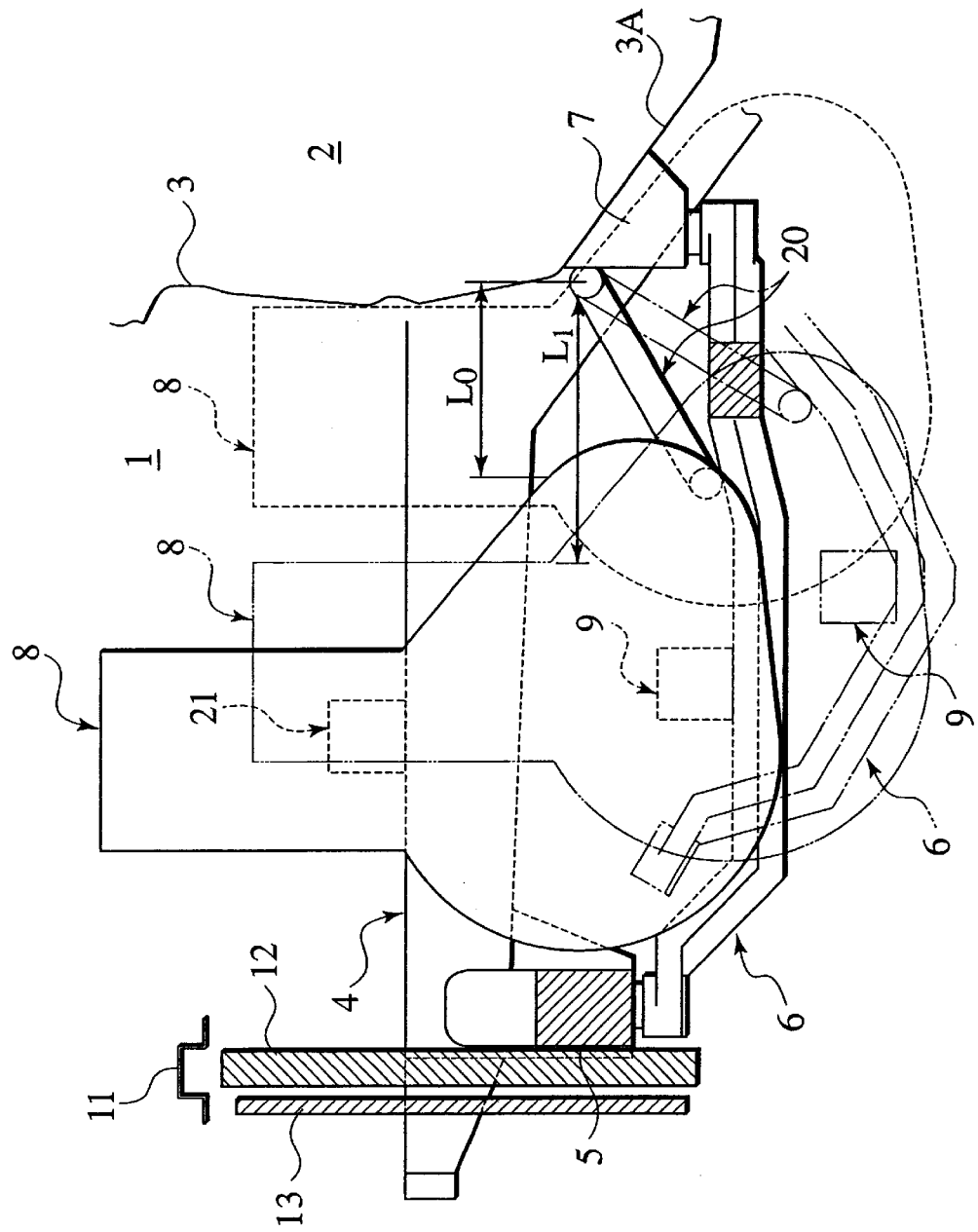
FIG. 6 is a schematic explanatory side view of the third embodiment of the invention.

FIG. 6 shows a third embodiment of the present invention. In the third embodiment, the rods 10 in the second embodiment are eliminated, and the engine body 8 is supported by the front side member 4 through a mount member 21 in the vibration-proof manner.

Figure 7:
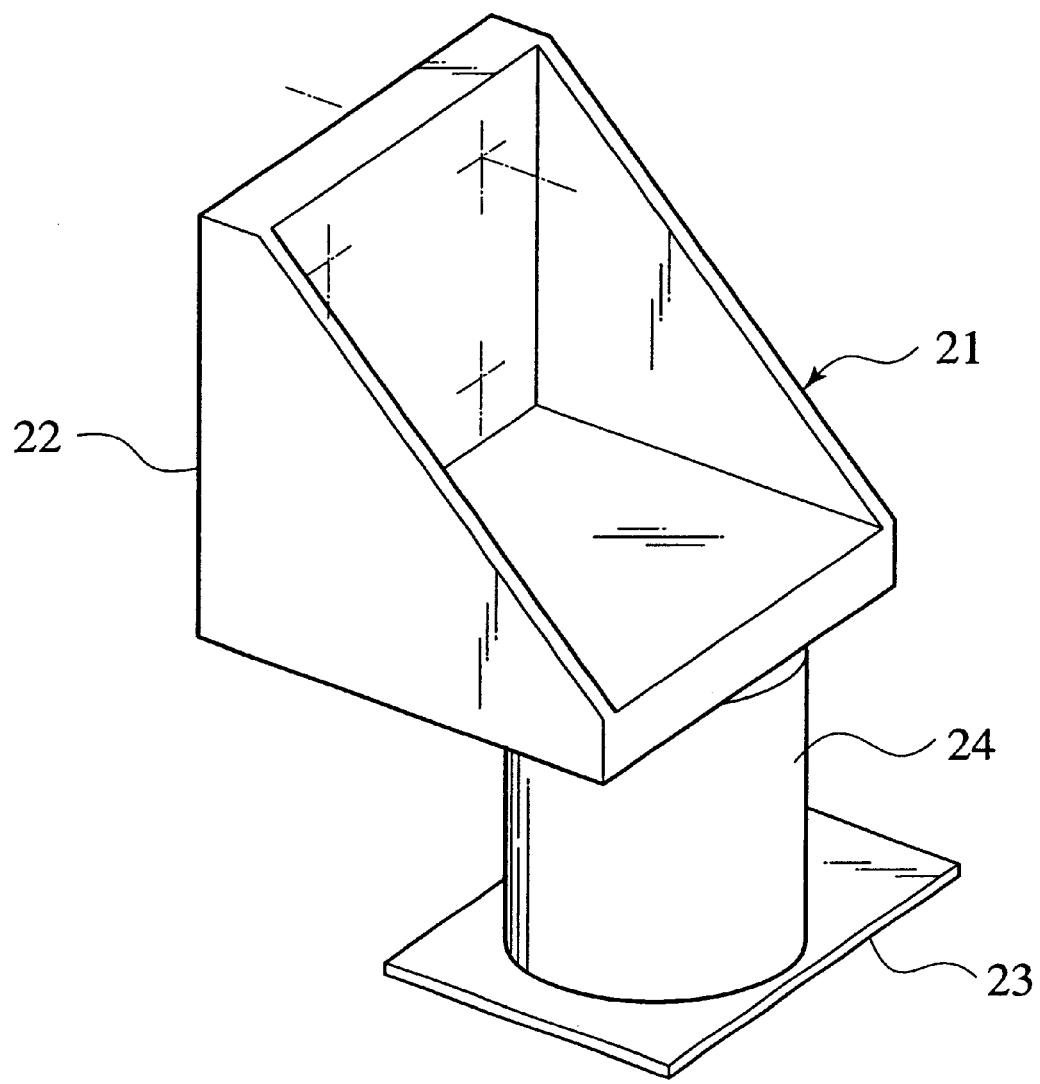
FIG. 7 is a perspective view showing a mount member in the third embodiment.

As shown in FIG. 7, in this mount member 21, a cylindrical block-like insulator 24 is vertically connected between the engine side bracket 22 coupled to the engine body 8, the vibration-proof function is exhibited by the insulator 24, the insulator 24 is broken to release the supporting connection between the engine body 8 and the front side member 4 is released with respect to the relative movement between the front side member 4 and the engine body 8 in the longitudinal direction.

The connecting structure of the lower portion of the engine body 8 and the subframe 6, and the connecting structure of the guide rod 20, between the subframe 6 and the toe board 3A are the same as those in the second embodiment.

Therefore, according to the third embodiment, at the normal time, transmission suppressing effect of the vibration of the engine body 8 toward the vehicle body can sufficiently be secured by the vibration-proof support of the engine body 8 by the mount member 21 at the at the front side member 4, and the vibration-proof support by the mount member 9 at the subframe 6 and the vibration-proof function of the insulator 16 in the connecting portion of the guide rod 20.

At the time of head-on collision of a vehicle, the front side member 4 is originally project forward of the subframe 6 because the bumper (not shown) is mounted, and the collision load is applied to the front side member 4 first as the axial pressure crushing force. Therefore, the front side member 4 is buckled and deformed in the axial direction first, and deviation (relative movement) in the longitudinal direction is generated between the front side member 4 and the engine body 8.

Due to this deviation, the insulator 24 of the mount member 21 is broken, the subframe 6 is folded and deformed into the L-shape around the intermediate portion of the subframe 6 by the input of the collision load to the subframe 6, the lower portion of the engine body 8 is connected to the intermediate portion of the subframe through the connecting member, and the engine body 8 moves downward with respect to the vehicle body. In addition, the rear side portion of the subframe 6 is pulled into the lower portion of the toe board 3A by the guide rod 20, and the rotation behavior in which the lower portion of the engine body 8 gets into the vacant space below the toe board 3A is applied to the engine body 8.

As a result, like the second embodiment, a distance of the shortest portion between the engine body 8 and the dash panel 3 is increased from $L_0$ to $L_1$ as compared with the length before collision, the crushing stroke in the longitudinal direction can be increased even if the entire length of the engine room 1 is not increased, the buckling deformation of the front side member 4 in its longitudinal direction is appropriately conducted, the collision energy is rationally absorbed, the interference between the lower portion of the engine body 8 and the toe board 3A is avoided, and the dash panel 3 is prevented from being deformed toward the compartment 2.

Figure 8:
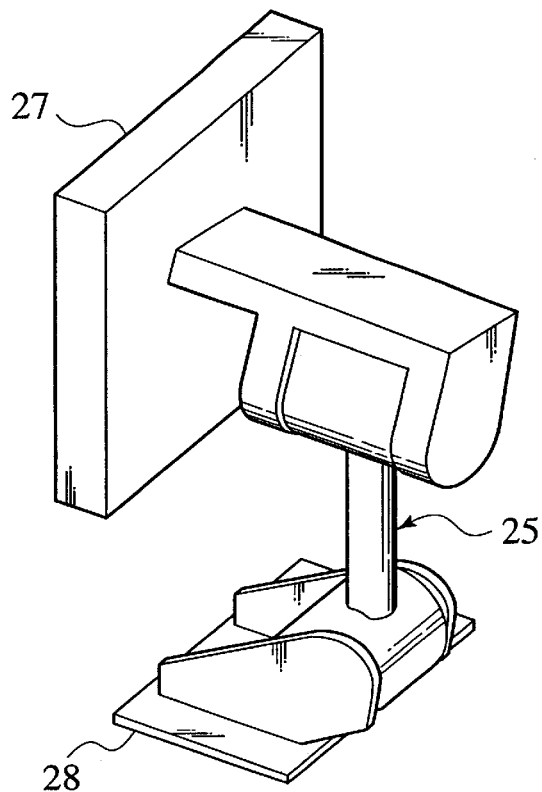
FIG. 8 is a perspective view showing a rod as a connecting member.
Figure 9:
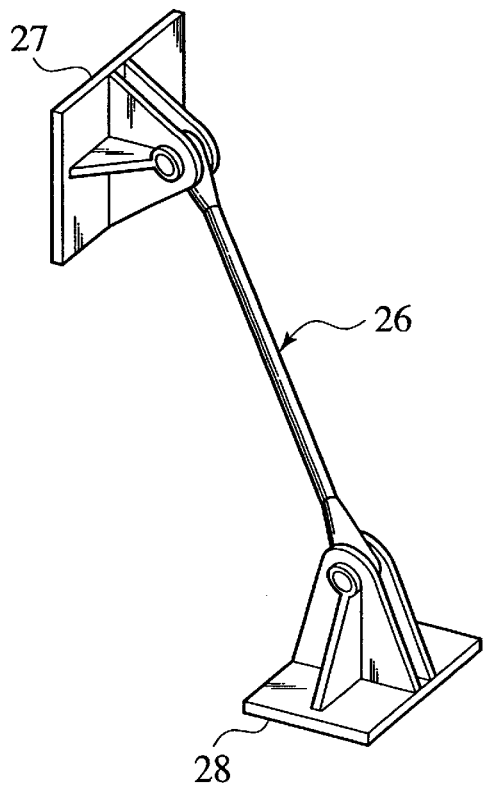
FIG. 9 is a perspective view showing a wire as the connecting member.

Although the mount member 9 of the vibration-proof bush type is used as the connecting portion between the lower portion of the engine body 8 and the intermediate portion of the subframe 6 in the present embodiment, general connecting means such as a rod 25 shown in FIG. 8 or a wire 26 shown in FIG. 9 may be used to advantageously reduce the costs.

If the rod 25 is used, the rod 25 is rotatably connected between an engine side bracket 27 connected to the engine body 8 and a frame side bracket 28 connected to the subframe 6. In this case, a connection axis of the brackets 27 and 28, i.e., a rotation center axis of the rod 25 intersects the longitudinal direction and the widthwise direction of the vehicle so that the rod 25 can follow the vibration of the engine.

When the wire 26 is used, the wire 26 is provided between the brackets 27 and 28. In any cases, when the intermediate portion of the subframe 6 is downwardly folded and deformed, the engine body 8 can be dragged and moved downward in an integral manner with the subframe 6 by the rod 25 or the wire 26.

In each of the embodiments, the lower rear portion of the engine body 8 largely swells toward the dash panel, but the present invention is not limited to this, and a motor unit in an electric automobile may be used as the power unit rather than the engine body.

Further, the mounting chamber 1 is set to the front compartment, but the mounting chamber 1 may be set to the rear compartment against the rear collision.

Japanese Patent Application No. 2001-11862 (filed on Jan. 19, 2001) is incorporated herein by reference in its entirety.

What is claimed is:

1. A power unit layout structure for an automobile for mounting a power unit in a mounting chamber partitioned by a partition wall on a front side or a rear side of a compartment, comprising:
   a side member capable of buckling and deforming in a longitudinal direction with respect to a longitudinal collision of a vehicle;
   a subframe located at a position lower than the side member and having an intermediate portion capable of folding and deforming by a longitudinal collision load;
   a connecting member for connecting a lower portion of a power unit and the intermediate portion of the subframe; and
   a rod for connecting an upper portion of the power unit and a radiator core rail of the mounting chamber so as to transmit a collision load to the power unit to promote a rotation of the power unit in the longitudinal direction,
   wherein when the vehicle collides in the longitudinal direction, the intermediate portion of the subframe is downwardly folded and deformed, and the power unit is rotated in the longitudinal direction around a lower connecting point by load transmission applied to an upper portion of the power unit through the rod.

2. A power unit layout structure for an automobile according to claim 1, wherein a height of a connection point position on the side of the power unit of the rod from the ground is set higher than a height of a connection point position on the side of the radiator core rail.

3. A power unit layout structure for an automobile according to claim 1, wherein a radiator core rail of the mounting chamber to which the rod is connected is a member to which a collision load is input early at the time of longitudinal collision of a vehicle.

4. A power unit layout structure for an automobile according to claim 1, wherein the rod is rotatably connected to at least one of the power unit and a radiator core rail of the mounting chamber.

5. A power unit layout structure for an automobile according to claim 1, wherein vibration-proof member is interposed at least between the rod and the power unit and between the rod and a radiator core rail of the mounting chamber.

6. A power unit layout structure for an automobile according to claim 1, wherein at least one of the rod, the power unit and a radiator core rail of the mounting chamber is connected such that it can separated from a load in a tensile direction.

7. A power unit layout structure for an automobile according to claim 1, wherein rotation behavior in which a lower portion of the power unit gets into a lower portion of the partition wall is applied when the intermediate portion of the subframe is folded and deformed downward between the subframe and the partition wall between the mounting chamber and the compartment.

8. A power unit layout structure for an automobile for mounting a power unit in a mounting chamber partitioned by a partition wall on a front side or a rear side of a compartment, comprising:
   a side member capable of buckling and deforming in a longitudinal direction with respect to a longitudinal collision of a vehicle;
   a subframe located at a position lower than the side member and having an intermediate portion capable of folding and deforming by a longitudinal collision load;
   a connecting member for connecting a lower portion of a power unit and the intermediate portion of the subframe; and
   a rod for connecting an upper portion of the power unit and a radiator core rail of the mounting chamber,
   wherein a pair of rods are provided between the power unit and opposite sides of the radiator core rail in a widthwise direction of the vehicle in a form of V-shape as viewed from above,
   wherein when the vehicle collides in the longitudinal direction, the intermediate portion of the subframe is downwardly folded and deformed, and the power unit is rotated in the longitudinal direction around a lower connecting point by load transmission applied to an upper portion of the power unit through the rod.

9. A power unit layout structure for an automobile according to claim 8, wherein a height of a connection point position on the side of the power unit of the rods from the ground is set higher than a height of a connection point position on the side of the radiator core rail.

10. A power unit layout structure for an automobile according to claim 8, wherein a radiator core rail of the mounting chamber to which the rods are connected is a member to which a collision load is input early at the time of longitudinal collision of a vehicle.

11. A power unit layout structure for an automobile according to claim 8, wherein the rods are rotatably connected to at least one of the power unit and a radiator core rail of the mounting chamber.

12. A power unit layout structure for an automobile according to claim 8, wherein vibration-proof member is interposed at least between the rods and the power unit and between the rods and a radiator core rail of the mounting chamber.

13. A power unit layout structure for an automobile according to claim 8, wherein at least one of the rod, the power unit and a radiator core rail of the mounting chamber is connected such that it can separated from a load in a tensile direction.

* * * * *